United States Patent [19] Seki et al.

[11] 3,904,972

[45] Sept. 9, 1975

[54] ACOUSTIC AMPLIFIER

[75] Inventors: Kunio Seki, Kodaira; Yoshio Sakamoto, Kokubunji, both of Japan

[73] Assignee: Hitachi, Ltd., Japan

[22] Filed: Apr. 27, 1973

[21] Appl. No.: 355,097

[30] Foreign Application Priority Data

May 10, 1972 Japan .................................. 47-45500

[52] U.S. Cl. ........................ 330/22; 330/17; 330/20; 330/24; 330/30 D

[51] Int. Cl.[2] ............................................ H03F 3/68

[58] Field of Search ........ 330/199, 22, 40; 307/137, 307/242 A; 317/50; 84/1.26, 1.01, DIG. 7

[56] References Cited

UNITED STATES PATENTS

| | | | |
|---|---|---|---|
| 2,953,055 | 9/1960 | Hanert | 84/1.26 |
| 2,953,056 | 9/1960 | Hanert | 84/1.26 |
| 3,003,383 | 10/1961 | Williams | 84/1.26 |
| 3,290,562 | 12/1966 | Faulkner et al. | 317/231 |
| 3,588,525 | 6/1971 | Hatsukano | 307/247 A |

*Primary Examiner*—Nathan Kaufman
*Attorney, Agent, or Firm*—Craig & Antonelli

[57] ABSTRACT

An acoustic amplifier comprises a starter circuit which sets the output potential of an output amplifier circuit at ground potential upon the connection of the power supply and then gradually raises the output potential up to the operating voltage of the output amplifier circuit, whereby the load of the acoustic amplifier is made operative without "pop" noise.

8 Claims, 7 Drawing Figures

ACOUSTIC AMPLIFIER

BACKGROUND OF THE INVENTION

1. Field of the Invention

The present invention relates to acoustic amplifiers, and more particularly, to an acoustic amplifier which is so constructed as to prevent pop noise from arising at the closure of the power source switch.

2. Description of the Prior Art

In the field of acoustic amplifiers, so-called pop noise generated when a power source is turned on has become a problem. Pop noise is generated by a cause as will be hereinafter described and is offensive to the ear. Moreover, an excessive current flows through a speaker as the load of the amplifier at the closure of the power source switch, and it is feared that the speaker may be damaged by the impulse of the excessive current.

SUMMARY OF THE INVENTION

Accordingly, a principal object of the present invention is to provide an acoustic amplifier which is free from pop noise arising at closure of a power source switch.

Another object of the present invention is to provide an acoustic amplifier which is provided with pop noise-preventing means being so constructed as to be independent of an amplifier circuit under steady state conditions.

Still another object of the present invention is to provide an acoustic amplifier for which it is not necessary to add a capacitor for the purpose of preventing pop noise.

The present invention itself and the other objects of the present invention will become apparent from the following description taken in conjunction with the accompanying drawings.

BRIEF DESCRIPTION OF THE DRAWINGS

FIG. 2*a* to 2*d* are characteristic diagrams for the acoustic amplifier circuit in FIG. 1, among which FIGS. 2*a* and 2*b* show changes-versus-time of a mid-point potential $V_q$ of a push-pull output amplifier circuit and a transient current flowing through an output terminal OUT in the case of the absence of a starting switch ST, respectively, while FIGS. 2*c* and 2*d* show changes-versus-time of the base potentials $(V_b)$ $Q_1$ and $(V_b)$ $Q_2$ of a pair of input transistors of a differential amplifier and the mid-point potential $V_q$ in the case of the presence of the starting switch ST, respectively.

PREFERRED EMBODIMENTS OF THE INVENTION

Figure 1:
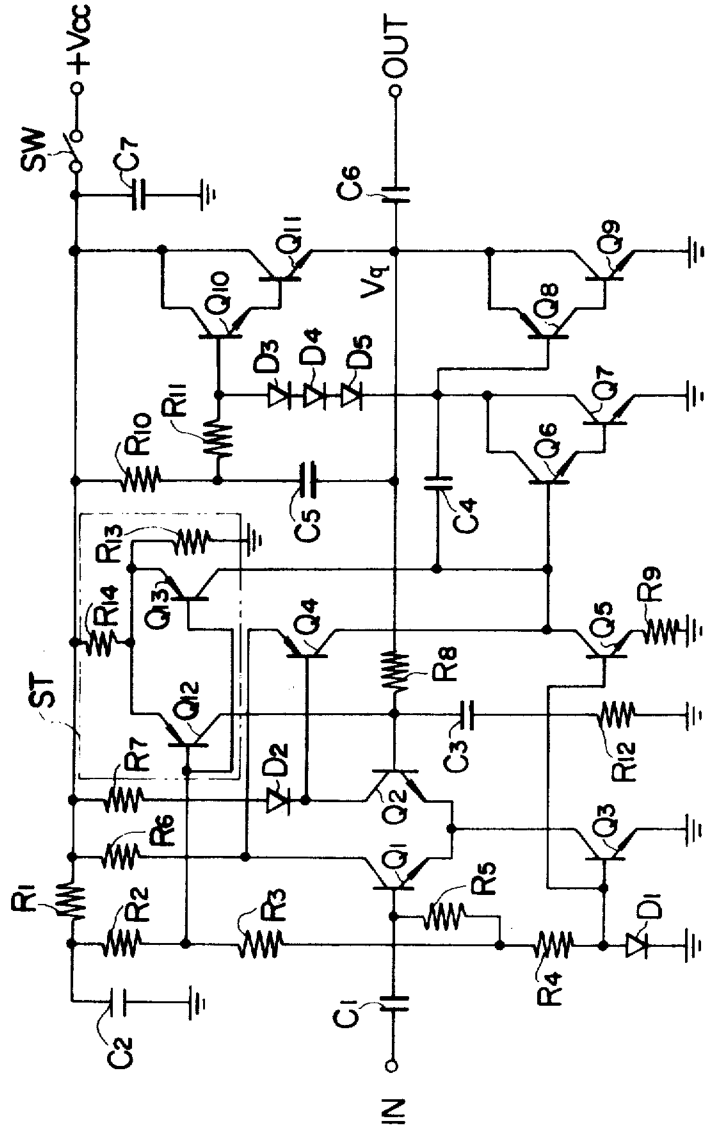
FIG. 1 is a circuit diagram showing an embodiment of an acoustic amplifier according to the present invention.

FIG. 1 shows an embodiment of an acoustic amplifier according to the present invention.

Illustrated as an example of the acoustic amplifier in the figure is a power amplifier circuit. Referring to the figure, transistors $Q_1$ to $Q_3$ constitute a part of a differential amplifier. The transistor $Q_3$ functions as a constant-current source. The base electrodes of the transistors $Q_1$ and $Q_2$ are respectively applied with a low-frequency input signal and a feedback signal. $C_1$ designates a capacitor, for coupling inputs, which is connected between an input terminal IN and the base electrode of the transistor $Q_1$. A capacitor $C_2$ is employed in order to attenuate the AC component of a supply voltage (namely, as a ripple filter).

Transistors $Q_4$ and $Q_5$ constitute the principal part of a level shift circuit, and function so as to lower the DC level of the output voltage of the differential amplifier.

Transistors $Q_6$ and $Q_7$ constitute a driver circuit which drives a push-pull circuit at the succeeding stage.

Transistors $Q_8$–$Q_{11}$ form a B-class push-pull amplifier circuit. Transistors $Q_8$ and $Q_9$ and transistors $Q_{10}$ and $Q_{11}$ are connected in Darlington configuration, respectively. As a result, transistors $Q_8$ and $Q_9$ form an equivalent PNP transistor, while transisors $Q_{10}$ and $Q_{11}$ form an equivalent NPN transistor. The output voltage $V_q$ of the amplifier circuit is supplied through a capacitor $C_6$ to an output terminal OUT, and is also fed back through resistors $R_8$ and $R_{12}$ and a capacitor $C_3$ to the differential amplifier at the preceding stage.

The feedback circuit is used in order to effect temperature compensation for the amplifier, and to make the distortion factor small.

$C_4$ indicates a capacitor for providing phase shift correction while $C_7$ represents a capacitor for preventing oscillations. A capacitor $C_5$ is employed for bootstrap.

In such a power amplifier circuit, a starting switch circuit ST employing a non-linear element composed of transistors $Q_{12}$ and $Q_{13}$ and resistors $R_{13}$ and $R_{14}$ is provided in accordance with the present invention in order to prevent the occurrence of pop noise.

The base electrodes of the transistos $Q_{12}$ and $Q_{13}$ are connected to the juncture between resistors $R_2$ and $R_3$, while the emitter electrodes are connected through the resistor $R_{14}$ to a voltage source $V_{cc}$. The resistor $R_{13}$ is connected between the emitter electrodes of the transistors $Q_{12}$ and $Q_{13}$ and a ground terminal. The emitter electrodes of the transistors $Q_{12}$ and $Q_{13}$, accordingly, have applied thereto a voltage which is produced by dividing the supply voltage $V_{cc}$ by the resistors $R_{13}$ and $R_{14}$. The collector electrode of the transistor $Q_{12}$ is connected to the capacitor $C_3$, while the collector electrode of the transistor $Q_{13}$ is connected to the input electrode of the transistor $Q_6$ of the driver circuit.

Before explaining the operation of the acoustic amplifier according to the present invention, the process in which pop noise is generated will be described in connection with the power amplifier circuit without the starting means ST.

In the absence of the starting means ST:

1. At the moment at which a power switch SW is turned on, the terminal voltage of the capacitor $C_2$ is O V, and hence, the transistors $Q_1$ and $Q_2$ are non-conductive. In consequence, the transistors $Q_4$ and $Q_6$–$Q_9$ are also non-conductive. Since the time constant of resistor $R_{10}$ and the capacitor $C_5$ is small, the output potential $V_q$ of the push-pull circuit (the mid-point potential) instantly rises from its original state (the electric potential of the circuit before the closure of the power switch SW) to potential of the supply voltage $V_{cc}$. 2. When the mid-point potential $V_q$ becomes equal to the supply voltage $V_{cc}$, the capacitor $C_3$ is charged through the resistor $R_8$. The base potential of the transistor $Q_2$ is thereby made higher than that of the transistor $Q_1$, so that the transistor $Q_2$ is rendered conductive. As a result, the transistors $Q_4$ and $Q_6$–$Q_9$ are rendered conductive, and the mid-point potential $V_q$ becomes substantially equal to ground potential (the original potential).

3. When the mid-point potential $V_q$ becomes equal to ground potential, charges stored in the capacitor $C_3$ are discharged through the resistor $R_8$. The base potential of the transistor $Q_2$ becomes lower than that of the transistor $Q_1$ and the mid-point potential $V_q$ suddenly increases to the supply voltage $V_{cc}$ again.

4. Subsequently, the capacitor $C_3$ is charged again. Finally, the base potentials of the transistors $Q_1$ and $Q_2$ reach an equilibrium point and the mid-point potential $V_q$ is set at a predetermined value (for example, $\frac{1}{2}V_{cc}$).

Figure 2A:
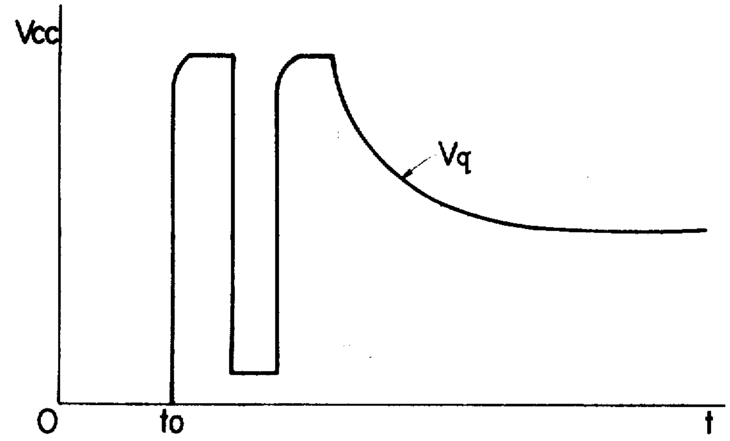
Figure 2B:
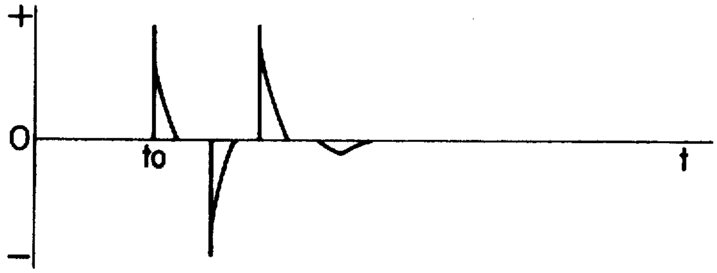

In this manner, in the absence of the starting means ST, the mid-point potential $V_q$ travels or changes between the ground potential and the supply voltage as is illustrated in FIG. 2*a*. To the load terminal OUT, there flows a transient current which is as shown in FIG. 2*b* and which results from a differentiation of the mid-point voltage $V_q$ by the coupling capacitor $C_6$. Pop noise is generated at this time.

The embodiment in FIG. 1 employs the starting switch circuit ST which, in order to prevent a large transient current from flowing to the load at the moment of the closure of the power source switch, operates so as to first set the mid-point potential $V_q$ at approximately ground potential at the instant of the connection of the power supply, and to thereafter raise the mid-point potential $V_q$ gradually from the ground potential to, for example, the potential of a half of the supply voltage $V_{cc}$. When the mid-point potential $V_q$ becomes equal to ½ $V_{cc}$, the starting switch circuit ST becomes independent of a signal path for low-frequency signals. Description will now be made of the operation.

In the presence of the starting means ST:

1. At the moment at which the power switch SW is turned on, the terminal voltage of the capacitor $C_2$ is O V, so that the base potentials of the transistors $Q_{12}$ and $Q_{13}$ become O V. Simultaneously therewith, the base-emitter junctions of the transistors $Q_{12}$ and $Q_{13}$ are biased in the forward direction, to render the transistors conductive. Upon the conduction of the transistor $Q_{13}$, the transistors $Q_6$ and $Q_7$ are also rendered conductive (saturated). The mid-point potential $V_q$ is first set, as illustrated in FIG. 2*d*, at O V (strictly, at 2 $V_{be\ sat}$ where $V_{be\ sat}$ denotes the base-emitter voltage drop in the saturation region).

2. Since the transistor $Q_{12}$ is conductive, the capacitor $C_3$ is charged through the transistor $Q_{12}$, and the capacitor $C_2$ is also gradually charged through resistor $R_1$. As the capacitor $C_2$ is gradually charged, the base potentials of the transistors $Q_{12}$ and $Q_{13}$ become higher. Eventually, the transistors $Q_{12}$ and $Q_{13}$ are reverse-biased and rendered non-conductive at a time $t_1$.

Figure 2C:
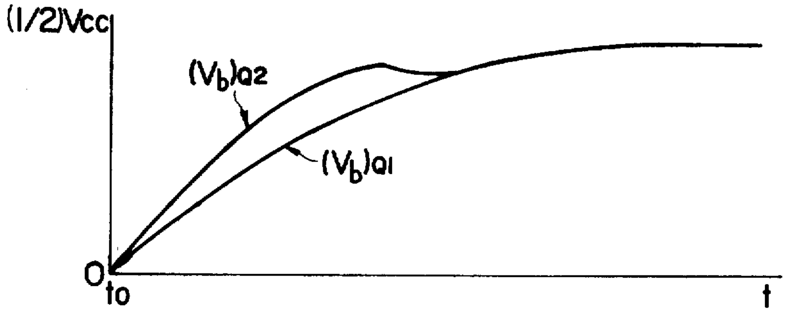
Figure 2D:
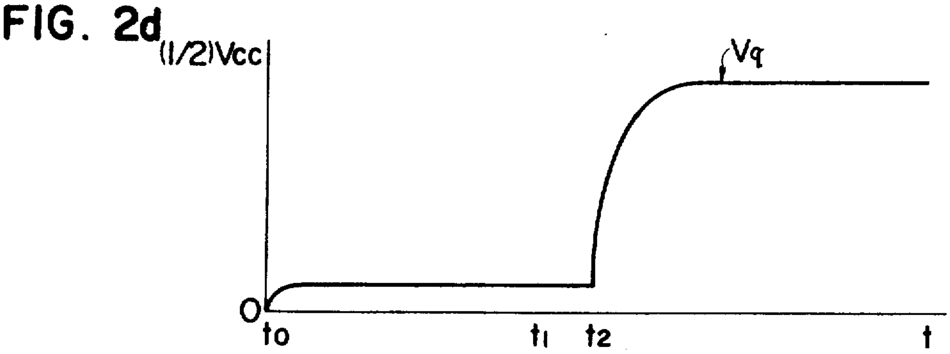

The transistor $Q_2$ is rendered conductive (saturated) at this time, since the capacitor $C_3$ is charged by previously rendering the transistor $Q_{12}$ conductive so that, as illustrated in FIG. 2*c*, the base potential $(V_b)$ $Q_2$ of the transistor $Q_2$ may become higher than the base potential $(V_b)$ $Q_1$ of the transistor $Q_1$. Upon the conduction of the transistor $Q_2$, the transistor $Q_4$ is rendered conductive, and accordingly, the transistors $Q_6$ and $Q_7$ continue to operate in the saturation region.

3. Subsequently, since the mid-point potential $V_q$ is substantially O V, the charges stored in the capacitor, $C_3$ are discharged through the path of feedback resistor $R_8$, the transistor $a_9$, ground, and resistor $R_{12}$ and the base potential $(V_b)$ $Q_2$ begins to decrease. On the other hand, the base potential $(V_b)$ $Q_1$ continues to rise, and the difference between both the base potentials becomes small. In due course, the differential amplifier begins to operate in a linear region (dynamic range) in its transmission characteristic at a time $t_2$. As shown in FIG. 2*d*, the mid-point potential $V_q$ rises gradually.

Upon an increase in the mid-point potential $V_q$, the discharge action of the capacitor $C_3$ becomes slow. When the mid-point potential $V_q$ exceeds the base potential $(V_b)$ $Q_2$, the capacitor $C_3$ begins charging again. With the charging, the base potentials $(V_b')_{Q1}$ and $(V_b)$ $Q_2$ rise substantially in balance. Finally, the differential amplifier is balanced, and the mid-point potential $V_q$ is fixed at ½ $V_{cc}$. (at no signal)

It is required that, when the transistor $Q_{13}$ falls into the cut-off region, the base potential $(V_b)$ $Q_2$ be higher than the base potential $(V_b)$ $Q_1$. To this end, it is necessary that the time constant involved in the charging of the capacitor $C_2$ be made larger than the time constant involved in the charging of the capacitor $C_3$. Although various elements are concerned with the time constants, such requirement is fulfilled by, for example, making the resistance of the resistor $R_1$ in the bias circuit and the capacitance of the capacitor $C_2$ sufficiently large for attenuating ripples. Even if the constants of the bias circuit are altered in this manner, the characteristics of the low-frequency amplifier are not influenced.

As described above, in accordance with the present embodiment, the mid-point potential $V_q$ is first set at ground potential and then it gradually increases from this voltage to ½ $V_{cc}$, as illustrated in FIG. 2*d*. Therefore, no large current flows through the load. The pop noise can, accordingly, be prevented.

In the steady state reached at a short time after the closure of the power supply switch, the transistors $Q_{12}$ and $Q_{13}$ automatically fall into the cut-off region. The time constant circuit ($C_2$, $R_1$, etc.) of the starting switch ST is thereby isolated from the path of low-frequency signals at, for example, the base electrodes of the transistors $Q_2$ and $Q_6$. It is, therefore, unnecessary to consider the capacitor $C_2$, the resistor $R_1$, etc. among the design conditions of the signal path of the amplifier on account of the starting switch ST and the time constant circuit thereof. Accordingly, the circuit design is subject to no restriction. The low-frequency signals are not influenced by the capacitor $C_2$, resistor $R_1$ etc., so that the design of the signal paths can be made with these elements neglected. The design of electrical characteristics such as low frequency characteristics is, therefore, facilitated.

These advantageous features are accomplished by the operation of the starting means ST that it functions only during the period of transition after the closure of the power source, and that it is independent of the amplifier circuit under steady state conditions.

Where the non-linear elements of the transistors $Q_{12}$ and $Q_{13}$ are rendered conductive at the transition and non-conductive under steady state conditions, the capacitors $C_2$ and $C_3$ intrinsically required in the amplifier circuit are utilized for the time constant circuit of the starter circuit and in the present embodiment. It is thus unnecessary to add new capacitors. (It has been a recent tendency that the linear circuit of the acoustic amplifier, etc. is put into the form of an integrated semiconductor circuit, similarly to the digital circuit. From the viewpoint of an occupied area, however, it is difficult to make a capacitor of large capacity in a monolithic semiconductor substrate. It is, therefore, necessary to mount capacitors in the individual form outside the substrate. Accordingly, an increase in the number of capacitors increases not only the number of components, but also the number of external terminals of the integrated semiconductor circuit. Also, it leads to an increase in the number of operations at assembly.)

It is, accordingly, very effective that, as in the present embodiment, the capacitors, being originally necessary, can be utilized as they are.

As a further advantage of the present embodiment, the following can be mentioned.

The period ($t_2$–$t_0$) during which the mid-point potential $V_q$ is held substantially at O V can be made long by making large the time constant based on the capacitor $C_2$ and the resistor $R_1$, etc. The signal of a small signal-amplifier circuit to be connected at the stage preceding the power amplifier circuit, can thus be prevented from flowing to the speaker of the load during that period.

More specifically, even if a signal causing the pop noise is generated in the small signal-amplifier circuit, the pop noise will not occur in the speaker since the power amplifier circuit does not operate during the period from the time $t_0$ to the time $t_2$. The necessity for providing separate, pop noise-preventing means for the small signal-amplifier circuit is, therefore, eliminated.

Figure 3:
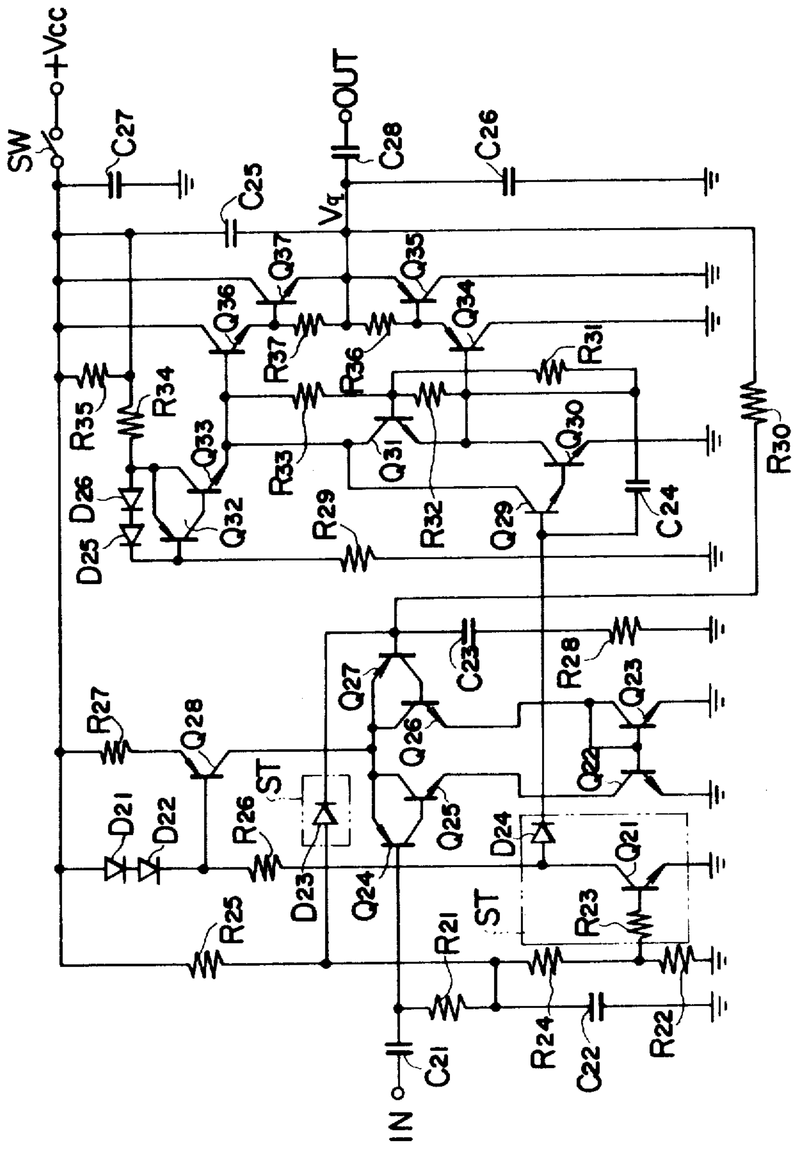
FIGS. 3 and 4 are circuit diagrams each showing another embodiment of the present invention.

FIG. 3 shows another embodiment of the acoustic amplifier according to the present invention. The fundamental construction of the amplifier circuit except the starting switch ST is similar to the embodiment in FIG. 1.

Referring to FIG. 3, a diode $D_{23}$ is connected between a capacitor $C_{22}$ for a ripple filter and a capacitor $C_{22}$ for DC feedback.

The cathode electrode of a diode $d_{24}$ is connected to the base electrode of a transistor $Q_{29}$ of an A-class driver circuit, while the anode electrode is connected to the collector electrode of a transistor $Q_{21}$.

The grounded emitter type transistor $Q_{21}$ has the base electrode grounded through resistors $R_{23}$ and $R_{22}$, and has the collector electrode connected to a voltage source $V_{cc}$ through a resistor $R_{26}$ and diodes $D_{21}$ and $D_{22}$.

The operation of the acoustic amplifier provided with such starter switch St will now be explained.

1. At the moment at which the power supply switch is turned on, the terminal voltage of the capacitor $C_{22}$ is O V, and hence, the transistor $Q_{21}$ is non-conductive. Via the diodes $D_{21}$, $D_{22}$ and $D_{24}$ and the resistor $R_{26}$, base currents flow in the transistor $Q_{29}$ and the transistor $Q_{30}$, to render the transistors $Q_{29}$ and $Q_{30}$ conductive. The mid-point potential $V_q$ is set at approximately O V.

Simultaneously therewith, the base potential of a transistor $Q_{27}$ is held at approximately O V, since the resistance of a resistor $R_{28}$ is sufficiently smaller than that of a resistor $R_{30}$. The diode $D_{23}$ is consequently forward-biased, and rendered conductive.

2. As the capacitor $C_{22}$ is gradually charged, the base potential of the transistor $Q_{21}$ increases. Therefore, the transistor $Q_{21}$ is rendered conductive (saturated). The collector potential of the transistor $Q_{21}$, namely, the anode potential of the diode $D_{24}$, becomes substantially ground potential and diode $D_{24}$ is rendered non-conductive.

At this time, the base potential of the transistor $Q_{27}$ has become higher than that of a transistor $Q_{24}$, since the capacitor $C_{23}$ has been charged by the previous conduction of the diode $D_{23}$. As has been explained in connection with the embodiment in FIG. 1, the mid-point potential $V_q$ continues to be substantially O V.

3. Thereafter, as in the embodiment in FIG. 1, the difference between the base potentials of the transistors $Q_{24}$ and $Q_{27}$ gradually decreases. As a result, the mid-point potential $V_q$ begins to gradually rise from approximately O V to ½ $V_{cc}$. Finally, the differential amplifier is brought into the equilibrium, to set the mid-point potential $V_q$ at ½ $V_{cc}$.

Under steady state condtions, the differential amplifier is balanced, and the base potentials of its transistors $Q_{24}$ and $Q_{27}$ are substantially equal. Therefore, the diode $D_{23}$ is reverse-biased by an amount corresponding to the voltage drop of a resistor $R_{21}$, and is held non-conductive.

In some differential amplifiers, the diode $D_{23}$ is somewhat forward-biased under steady state conditions. In this case, no inconvenience occurs unless the threshold voltage of the diode (about 0.7 V for a silicon diode) is exceeded.

Figure 4:
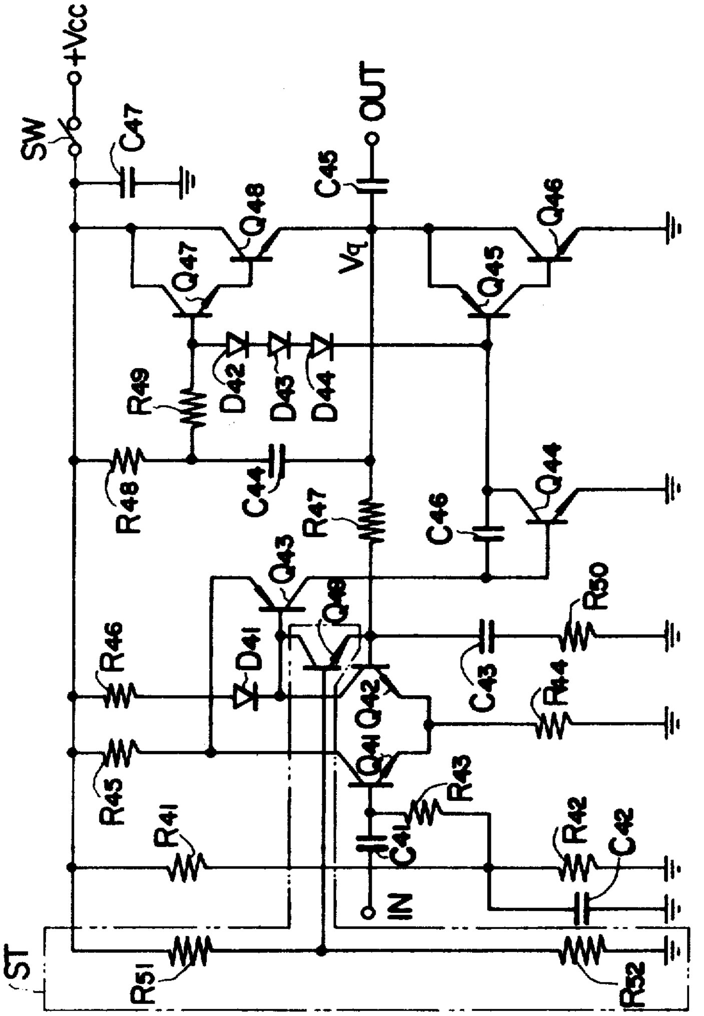

FIG. 4 shows still another embodiment of the acoustic amplifier according to the present invention.

Referring to the FIG., the starter switch ST is composed of resistors $R_{51}$ and $R_{52}$ and a transistor $Q_{49}$.

The resistors $R_{51}$ and $R_{52}$ are connected in series between a voltage source $V_{cc}$ and a ground terminal. The transistor $Q_{49}$ has its base electrode connected through the resistor $R_{51}$ to the voltage source $V_{cc}$, has its collector electrode connected to the base electrode of a transistor $Q_{43}$ for level shift purposes, and has its emitter electrode connected to a capacitor $C_{43}$ for DC feedback.

Description will now be made of the operation of the acoustic amplifier provided with such a starting switch circuit ST.

1. At the moment at which power switch SW is turned on, the base potential of a transistor $Q_{42}$ becomes approximately OV, to bias the transistor $Q_{49}$ in the forward direction and to render it conductive, because the resistance of a resistor $R_{50}$ is small as compared with that of a resistor $R_{47}$. Upon the conduction of the transistor $Q_{49}$, a base current flows in the transistor $Q_{43}$, and the transistor $Q_{43}$ is rendered conductive. Simultaneously therewith, transistor $Q_{44}$ is rendered conductive (saturated). The mid-point potential $V_q$ is set at substantially O V.

2. Thereafter, the transistor $Q_{49}$ becomes non-conductive, if the resistances of the resistors $R_{51}$ and $R_{52}$ are selected so as to satisfy the following condition:

$$\frac{R_{42}}{R_{41} + R_{42}} > \frac{R_{52}}{R_{51} + R_{52}} - \frac{V_{be}}{V_{cc}}$$

where $V_{be}$ denotes the threshold voltage of the transistor, and the voltage drop of a resistor $R_{43}$ is neglected.

At this time, the base potential of the tansistor $Q_{42}$ is made higher than the base potential of a transistor $Q_{41}$ in such a way that the transistor $Q_{49}$ is previously rendered conductive, to thereby charge the capacitor $C_{43}$. The mid-point potential $V_q$, therefore, continues to be substantially O V.

The subsequent operation is substantially the same as in the circuit in FIG. 1.

The present invention can eliminate pop noise by providing the starter switch ST circuit, not only in a power amplifier circuit, but also in a small signal-amplifier circuit or the like acoustic amplifier which is connected at the preceding stage of the power amplifier circuit.

Although, in the foregoing embodiments of the power amplifier circuits, the amplifier circuit at the preceding stage part has been described as being a differential amplifier circuit, it is needless to say that the present invention is similarly applicable to a power amplifier circuit in which a single stage of a class A amplifier circuit is arranged at the preceding stage.

The transistor $Q_{21}$ of the starting switch circuit in the acoustic amplifier in FIG. 3 is held conductive under steady state conditions, and current always flows therethrough. In contrast, the corresponding transistors in the embodiments in FIGS. 1 and 4 are held non-conductive under the steady state, so that the embodiments are effective in this respect.

In any of the foregoing embodiments, the ripple filter employed in the amplifier circuit is also used for the circuit which raises the output potential of the output amplifier circuit from the original potential to the steady state potential, whereby a reduction in the number of elements used is achieved. A separate time constant circuit, however, may also be connected at the input part of the starting switch circuit. In this case, the principal objects of the present invention, in that pop noise is eliminated and pop noise-preventing means is independent of the point at which the amplifier circuit is controlled by the switch circuit, under steady state conditions, can be achieved.

We claim:

1. An acoustic amplifier comprising:

a first amplifier circuit;

a second amplifier circuit having an input coupled to an output of said first amplifier circuit;

a power source terminal to which a source of power for said amplifier circuits is applied;

a power switch, one terminal of which is connected to said power source terminal;

a feedback means connected between an output of said second amplifier circuit and an input of said first amplifier circuit;

a capacitor connected between said input of said first amplifier circuit and ground potential;

first means, having a first terminal connected to another terminal of said power switch and a second terminal connected to said input of said second amplifier circuit, respectively, for setting the potential of the output of said second amplifier circuit at ground potential during a certain period of time starting from the instant of time when said power switch is closed; and second means, having a first terminal connected to said another terminal of the power switch and a second terminal connected to said capacitor, respectively, for supplying a charging current to said capacitor during said period of time.

2. An acoustic amplifier according to claim 1, wherein said first amplifier circuit comprises a differential amplifier circuit.

3. An acoustic amplifier according to claim 2, further including voltage divider circuits and wherein said first and second means are comprised of a transistor circuit having a reference potential input, a control input and a pair of outputs, said reference potential input and said control input being connected between said voltage divider circuits, said voltage divider circuits supplying a voltage produced by dividing a supply voltage to each of said inputs, and said power switch, and said pair of outputs being connected to an input of said differential amplifier circuit and the input of said second amplifier circuit, respectively.

4. An acoustic amplifier according to claim 2, further including a voltage divider circuit, and wherein said first and second means are comprised of a transistor circuit having a reference potential input, a control input and an output, said reference potential input being connected to one side of said differential amplifier circuit, said control input being connected between said voltage divider circuit, said voltage divider circuit supplying a voltage produced by dividing a supply voltage to said control input, and said power switch and the output being connected to an input of said differential amplifier circuit.

5. An acoustic amplifier according to claim 2, wherein said second means comprises a first diode connected between a first reference point on a voltage divider circuit directly connected to said power switch and an input of said diffential amplifier circuit, and said first means comprises a transistor circuit including a transistor and a diode connected thereto, coupled between a second reference point on said voltage divider circuit and the input of said second amplifier circuit.

6. An acoustic amplifier according to claim 2, wherein said second amplifier circuit comprises a push-pull amplifier circuit.

7. An acoustic amplifier according to claim 6, wherein said second amplifier circuit further includes a driver circuit connected to said push-pull amplifier circuit, and further comprising a level shift circuit coupling the output of said differential amplifier circuit to said driver circuit.

8. An acoustic amplifier according to claim 6, further including a ripple filter circuit connected to said power switch, and wherein said feedback path comprises a resistor-capacitor network connected between the output of said push-pull amplifier circuit and an input of said differential amplifier circuit.

* * * * *